United States Patent
Liu

(10) Patent No.: US 10,165,506 B2
(45) Date of Patent: Dec. 25, 2018

(54) METHOD FOR SEARCHING FOR NETWORK AND TERMINAL

(71) Applicant: Guangdong Oppo Mobile Telecommunications Corp., Ltd., Dongguan, Guangdong (CN)

(72) Inventor: Hai Liu, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/850,753

(22) Filed: Dec. 21, 2017

(65) Prior Publication Data

US 2018/0270739 A1 Sep. 20, 2018

(30) Foreign Application Priority Data

Mar. 17, 2017 (CN) .......................... 2017 1 0163768

(51) Int. Cl.
*H04W 8/04* (2009.01)
*H04W 8/08* (2009.01)
(Continued)

(52) U.S. Cl.
CPC ............ *H04W 48/16* (2013.01); *H04W 8/04* (2013.01); *H04W 8/08* (2013.01); *H04W 48/04* (2013.01); *H04W 48/18* (2013.01); *H04W 8/18* (2013.01)

(58) Field of Classification Search
CPC ......... H04W 48/16; H04W 8/04; H04W 8/08; H04W 48/18; H04W 48/04
See application file for complete search history.

(56) References Cited

U.S. PATENT DOCUMENTS

| 2011/0136530 A1* | 6/2011 | Deshpande | ........... H04W 24/10 455/515 |
| 2012/0077541 A1* | 3/2012 | Wu | ........ H04W 88/06 455/552.1 |

(Continued)

FOREIGN PATENT DOCUMENTS

| CA | 2724871 A1 | 6/2012 |
| CN | 104902460 A | 9/2015 |

(Continued)

OTHER PUBLICATIONS

International search report issued in corresponding international application No. PCT/CN2017/117795 dated Mar. 21, 2018.

(Continued)

*Primary Examiner* — Brandon J Miller
(74) *Attorney, Agent, or Firm* — Young Basile Hanlon & MacFarlane, P.C.

(57) ABSTRACT

A method for searching for a network includes adding a mode in which a terminal searches for a WCDMA network to a list of modes in which the terminal searches for communication networks, when a SIM card inserted in the terminal belongs to a first operator not supporting a WCDMA standard; searching for a first WCDMA network operated in a visited place when the terminal roams to the visited place, and residing in the first WCDMA network to acquire location information of the visited place; and registering in a second WCDMA network operated in the visited place, according to the location information of the visited place. A terminal is also provided.

18 Claims, 4 Drawing Sheets

(51) Int. Cl.
*H04W 48/04* (2009.01)
*H04W 48/16* (2009.01)
*H04W 48/18* (2009.01)
*H04W 8/18* (2009.01)

(56) References Cited

U.S. PATENT DOCUMENTS

| | | | | |
|---|---|---|---|---|
| 2015/0056985 | A1* | 2/2015 | Swaminathan | H04W 88/06 455/432.1 |
| 2015/0351021 | A1 | 12/2015 | Zhang et al. | |
| 2016/0112578 | A1* | 4/2016 | Yang | H04W 48/18 455/432.1 |
| 2016/0337946 | A1* | 11/2016 | Kim | H04W 48/14 |
| 2017/0127229 | A1* | 5/2017 | Heikkinen | H04W 4/021 |
| 2017/0142760 | A1* | 5/2017 | Huang | H04W 76/18 |

FOREIGN PATENT DOCUMENTS

| | | |
|---|---|---|
| EP | 2900005 A1 | 7/2015 |
| EP | 3169110 A1 | 5/2017 |
| WO | 2016173337 A1 | 11/2016 |

OTHER PUBLICATIONS

"3 Generation Partnership Protect; Technical Specification Group Core Network and Terminals; Characteristics of the Universal Subscriber Identity Module (USIM) application", 3GPP Stanoaro; 3GPP TS 31.102, 3rd Generation Partnership Project (3GPP), Mobile Competence Centre; 650, Route Des Lucioles; F-06921 Sophia-Antipolis Ceoex; France, vol. CT WG6, No. V14.1.0, Jan. 19, 2017 (Jan. 19, 2017), pp. 1-278, XP051230590.

Lte Work Group: "SIMalliance LTE UICC profile", simalliance, Jun. 24, 2013 (Jun. 24, 2013), pp. 1-34, XP055321922.

3gpp: "3rd Generation Partnership Project; Technical Specification Group Services and System Aspects; Service accessibility (Release 13)", Sep. 4, 2014 (Sep. 4, 2014), XP055437555.

Extended European search report issued in corresponding European application No. 17207069.0.

* cited by examiner

METHOD FOR SEARCHING FOR NETWORK AND TERMINAL

CROSS-REFERENCE TO RELATED APPLICATION(S)

This application claims priority to Chinese Patent Application No. 201710163768.4, filed on Mar. 17, 2017, the contents of which is herein incorporated by reference in its entirety.

TECHNICAL FIELD

The present disclosure relates to communication technology, and in particular, to a method for searching for a network and a terminal.

BACKGROUND

A public land mobile network (PLMN) is a communication network established and operated by a government or an operator authorized by the government for the purpose of providing land mobile communication services for the public. The communication network is generally connected with a public switched telephone network (PSTN), so as to form a communication network on a whole area or country scale. An identifier of the PLMN is generally a string of digital codes, for example, the identifier of the PLMN of China Mobile is 46000, while the identifier of the PLMN of China Unicom is 46001.

With improvements in people's living, more and more users carry terminals (such as mobile phones) when making journeys abroad or having business trips. When a roaming (such as internationally roaming) user is to communicate, his/her terminal should search for a local communication network and access it, so as to enable normal communication. For example, when the terminal moves from a home place to a visited place (e.g., the terminal roams from a home country to a visited country), the terminal should access the PLMN in the currently visited place. However, currently in most cases, after the terminal moves from the home place to the visited place, it often takes a long time (sometimes, even tens of minutes) for the terminal to successfully access the PLMN in the currently visited place, which greatly worsens communication experience of the user.

In some cases, standards of the PLMNs provided by operators of different countries are different from each other. Sometimes, even the standards in a country A may be distinct from the standards supported by an operator b of a country B. Hence, after a subscriber identity module (SIM) card of the operator b of the country B internationally roams to the country A, the communication networks in the country A may not be included in those preferentially searched for, thereby failing to access the communication networks. The communication networks may not be searched for in a full radio access technology (FULL RAT) mode until a "no-service" timer times out.

BRIEF DESCRIPTION OF THE DRAWINGS

In order to more clearly describe technical solutions of implementations of the present disclosure or prior art, accompanying drawings used for illustrating the implementations or prior art will be briefly introduced hereinafter. Apparently, the accompanying drawings described below show some implementations of the present disclosure, and persons skilled in the art may also derive other drawings from these accompanying drawings without creative efforts.

DETAILED DESCRIPTION

Figure 1:
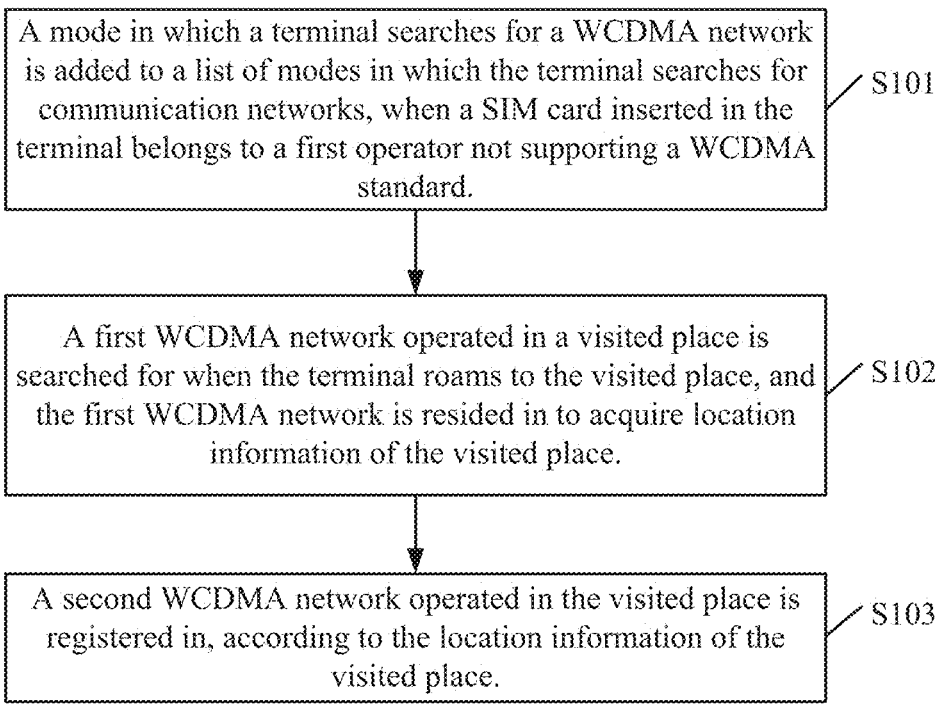
FIG. 1 is a flowchart of a method for searching for a network according to an implementation of the present disclosure.

A description for the implementations of the present disclosure is provided below, in conjunction with the drawings in the implementations of the present disclosure.

The terms "first", "second", "third", "fourth" and the like in the description, claims, and drawings are used to distinguish between different objects, rather than used to indicate a specified order. Furthermore, the terms "include" and "comprise" as well as any variants thereof are intended to cover non-exclusive inclusion. For example, a process, method, system, product, or device including a series of steps or units is not limited to the listed steps or units, but may optionally further include steps or units not listed, or optionally further include other steps or units inherent in the process, method, system, product, or device.

The term "implementation" mentioned in the present disclosure is intended to mean that specific features, structures, or characteristics described in conjunction with the implementations may be included in at least one implementation. This term "implementation" appearing at various places throughout the specification does not necessarily refer to the same implementations, or independent or alternative implementations that are mutually conflicting with other implementations. Persons skilled in the art can explicitly and implicitly understand that the implementations described herein may be combined with other implementations.

A part of the terms in the present disclosure are explained below, so as to facilitate understanding by persons skilled in the art.

A terminal, also called user equipment (UE), is a device providing voice and/or data communication for a user, such as a handheld device, an on-board device having a wireless access function. A common terminal may include, for example, a mobile phone, a tablet computer, a notebook computer, a palm computer, a mobile internet device (MID), a wearable device, an intelligent bracelet, a pedometer, a moving picture experts group audio layer III (MP3) player, a moving picture experts group audio layer IV (MP4) player, a personal digital assistant (PDA), a laptop computer, and the like.

Long term evolution (LTE) is a global universal standard based on orthogonal frequency division multiple access (OFDMA) technology and established by the 3GPP organization. The LTE includes a frequency division duplexing (FDD) mode and a time division duplexing (TDD) mode which are used for paired frequency spectrums and nonpaired frequency spectrums respectively. The TDD-LTE and FDD-LTE are different in encoding and decoding, frame format, air interface, signaling, and network architecture.

An integrated circuit card identity (ICCID), i.e., a number of a subscriber identification module (SIM) card, may be an identity card of a mobile phone number. The ICCID is a unique identification number of an IC card, and consists of 20 digits. The first six digits of the ICCID are a code of an operator, the code of China Mobile being 898600, 898602, the code of China Unicorn being 898601, 898609, and the code of China Telecom being 898603, 898606.

"Multiple" means two or more than two. "And/or", describing associated relationships of associated objects, indicates three kinds of relationships. For example, A and/or B may mean only A, only B, or both A and B. The character "/" generally indicates that the associated objects before and after it have a "or" relationship.

FIG. 1 is a flowchart of a method for searching for a network according to an implementation of the present disclosure. The method will be described in detail below with reference to FIG. 1. As illustrated in FIG. 1, the method may begin at block S101.

At block S101: a mode in which a terminal searches for a WCDMA network is added to a list of modes in which the terminal searches for communication networks, when a SIM card inserted in the terminal belongs to a first operator not supporting a WCDMA standard.

In at least one implementation, the terminal or a processor in the terminal adds the mode in which the terminal searches for the WCDMA network to the list of modes in which the terminal searches for the communication networks, and the SIM card inserted in the terminal belongs to the first operator not supporting the WCDMA standard.

In at least one implementation, the first operator may be a home operator.

In at least one implementation, the first operator may be China Mobile.

In at least one implementation, the SIM card belonging to the first operator may support the same standards as a SIM card belonging to China Mobile, or may support the WCDMA standard in visited place but cannot support the WCDMA standard in the home place.

At block S102: a first WCDMA network operated in a visited place is searched for when the terminal roams to the visited place, and the first WCDMA network is resided in to acquire location information of the visited place.

In at least one implementation, since the WCDMA standard is supported in the visited place and the mode in which the terminal searches for the WCDMA network is added to the list of modes in which the terminal searches for the communication networks, the terminal in which the SIM card is inserted, after roaming to the visited place, can normally search for one WCDMA network to acquire current location information of the terminal, i.e., the location information of the visited place, as long as the WCDMA standard is supported by the SIM card belonging to the first operator, even if none of communication standards supported by the first operator in the home place are the same as those supported in the visited place.

For example, in Japan and Korea, only the FDD-LTE standard and the WCDMA standard are supported, while China Mobile merely supports the TDD-LTE standard, a time division-synchronous code division multiple access (TD-SCDMA) standard, and a global system for mobile communication (GSM) standard, and thus a terminal in which the SIM card belonging to China Mobile is inserted searches by default preferentially for a TDD-LTE network, a TD-SCDMA network, and a GSM network in sequence, every time it is powered on. Apparently, none of the communication standards supported by China Mobile in China are the same as those supported in Japan or Korea. Therefore, the terminal, when roaming to Japan or Korea, cannot reside in any communication network operated in Japan or Korea even after searching for the TDD-LTE network, the TD-SCDMA network, and the GSM network for several times. Furthermore, the terminal will not search for the communication networks in a FULL RAT mode until a "no-service" timer times out. Consequently, it typically takes more than three minutes for the terminal to successfully reside in a communication network operated in Japan or Korea and acquire the current location information of the terminal when it roams to Japan or Korea.

In contrast, according to the present disclosure, since the mode in which the terminal searches for the WCDMA network is added to the list of modes in which the terminal searches for the communication networks, the terminal can earlier search for the WCDMA network when the terminal roams to the visited place, thereby effectively reducing time for searching and improving user experience.

In at least one implementation, the first WCDMA network is searched for on all frequency bands.

In at least one implementation, the location information of the visited place is an identifier of the first WCDMA network in which the terminal resides in.

In at least one implementation, the visited place may be Japan, Korea, or any location where the same communication standards as those supported in Japan or Korea are supported. The visited place is not limited in the present disclosure.

At block S103: a second WCDMA network operated in the visited place is registered in, according to the location information of the visited place.

In at least one implementation, after acquiring the location information of the visited place, the terminal can acquire a list of an identifier of at least one WCDMA network operated in the visited place from the first WCDMA network which the terminal resides in or a memory of the terminal, according to the location information of the visited place. Then, the terminal searches for the at least one WCDMA network according to the list of the identifier of the at least one WCDMA network, and registers in the second WCDMA network which the terminal can access. In this way, a waste of time and power consumption caused by searching for WCDMA networks operated in the visited place which the terminal cannot register in is avoided, thereby improving efficiency of searching.

In at least one implementation, an operator of the second WCDMA network has a roaming agreement with the first operator.

In at least one implementation, the first WCDMA network and the second WCDMA network are one and the same.

According to the preset disclosure, when the SIM card inserted in the terminal belongs to the first operator not supporting the WCDMA standard, the mode in which the terminal searches for the WCDMA network is added to the list of modes in which the terminal searches for communication networks, such that the terminal can normally search for and register in the WCDMA network after roaming, to the visited place where the WCDMA standard rather than other standards also supported by the SIM card of the first operator is supported, and the WCDMA network can be searched for in the FULL RAT mode before the no-service timer times out, thereby improving the efficiency of searching, reducing the time for searching, and in turn, improving the user experience.

Figure 2:
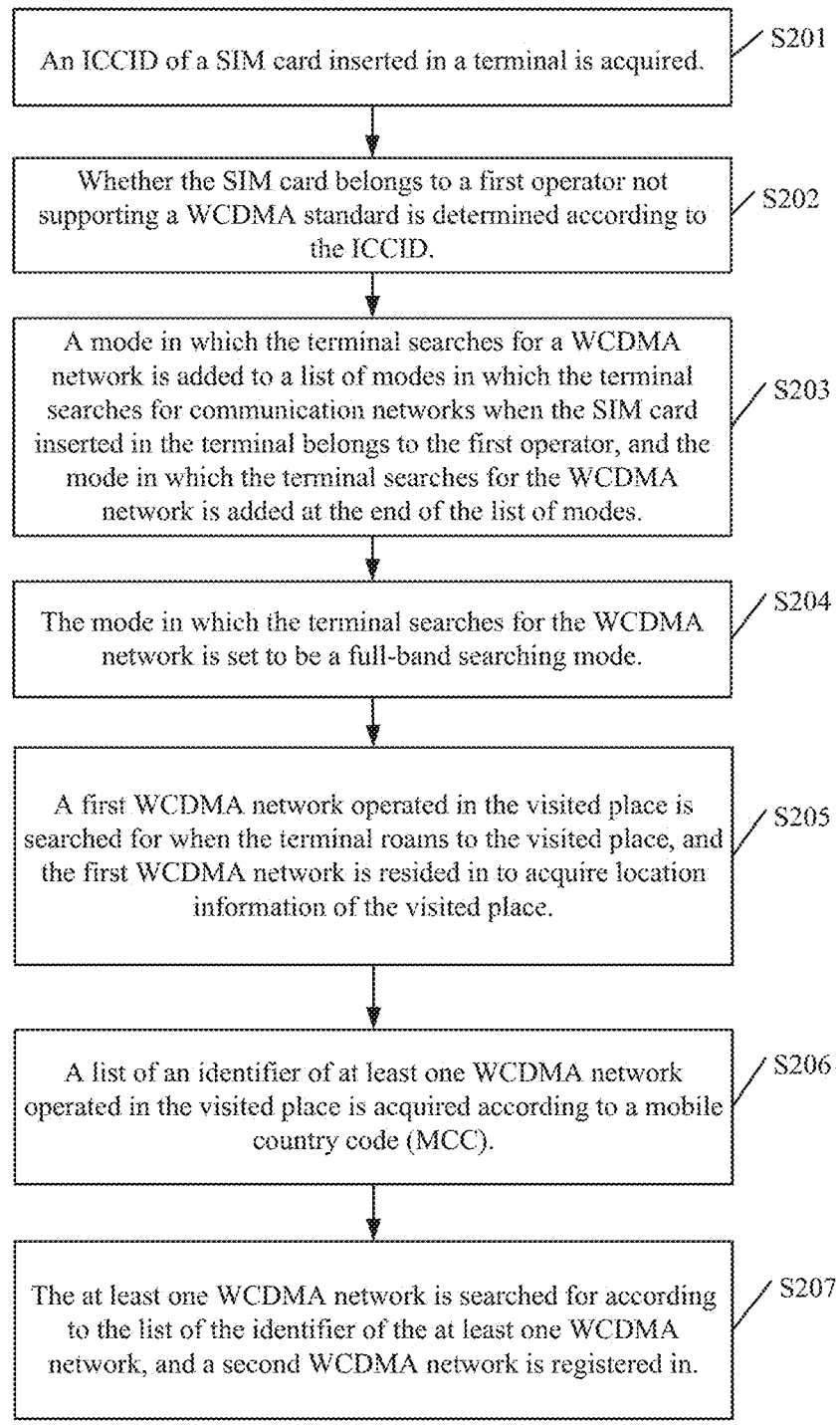
FIG. 2 is a flowchart of another method for searching for a network according to another implementation of the present disclosure.

FIG. 2 is a flowchart of another method for searching for a network according to another implementation of the present disclosure. The method will be described in detail below with reference to FIG. 2. As illustrated in FIG. 2, the method may begin at block S201.

At block S201: an ICCID of a SIM card inserted in a terminal is acquired.

In at least one implementation, the terminal or a processor in the terminal, when detecting that the SIM card is inserted in the terminal, acquires the ICCID of the SIM card to determine which operator the SIM card belongs to, according the ICCID.

At block S202: whether the SIM card belongs to a first operator not supporting a WCDMA standard is determined according to the ICCID.

In at least one implementation, the first operator may be any operator to which a SIM card supporting the WCDMA standard in a visited place but not supporting the WCDMA standard in a home place belongs.

At block S203: a mode in which the terminal searches for a WCDMA network is added to a list of modes in which the terminal searches for communication networks when the SIM card inserted in the terminal belongs to the first operator, and the mode in which the terminal searches for the WCDMA network is added at the end of the list of modes.

Some details at this block may be known with reference to the description of block S101. Furthermore, since the SIM card does not support the WCDMA standard in the home place, the time for searching may be increased when the terminal returns to the home place, if the WCDMA standard is added at the front of the list. However, when the WCDMA standard is added at the end of the list of modes, the terminal in which the SIM card is inserted can preferentially search for communication networks based on communication standards supported by the SIM card in the home place. Hence, the terminal does not need to search for the WCDMA network not supported by the SIM card in the home place. In this way, the time for searching is not increased in the home place, and registration is also ensured in the visited place.

At block S204: the mode in which the terminal searches for the WCDMA network is set to be a full-band searching mode.

In at least one implementation, since frequency bands of the WCDMA networks are different in various visited places, the WCDMA network are searched for on all the frequency bands. In this way, the frequency bands of the WCDMA networks in various visited places can be found, thereby facilitating searching and registering.

At block S205: a first WCDMA network operated in the visited place is searched for when the terminal roams to the visited place, and the first WCDMA network is resided in to acquire location information of the visited place.

Details at this block may be known with reference to the description of block S102, and is not repeated herein.

At block S206: a list of an identifier of at least one WCDMA network operated in the visited place is acquired according to a mobile country code (MCC). The first WCDMA network is one of the at least one WCDMA network.

The location information of the visited place includes the MCC. In at least one implementation, the location information of the visited place is an identifier of the first WCDMA network in which the terminal resides in. The terminal, after searching for and residing in the first WCDMA network, determines the visited place where the terminal is currently located, according to the MCC in the location information of the visited place, and hence can acquire the list of the identifier of the at least one WCDMA network operated in the visited place, so as to precisely search for the at least one WCDMA network. The list of the identifier of the at least one WCDMA network operated in the visited place may be stored in the terminal beforehand, or acquired from the first WCDMA network which the terminal resides in.

At block S207: the at least one WCDMA network is searched for according to the list of the identifier of the at least one WCDMA network, and a second WCDMA network is registered in. The second WCDMA network is one of the at least one WCDMA network.

In at least one implementation, the terminal, after acquiring the list of the identifier of the at least one WCDMA network operated in the visited place where the terminal is currently located, may search for the at least one WCDMA network according to the list of the identifier of the at least one WCDMA network, and register in the second WCDMA network which the terminal can access.

In at least one implementation, an operator of the second WCDMA network may have a roaming agreement with the first operator to which the SIM card inserted in the terminal belongs.

In at least one implementation, the first WCDMA network and the second WCDMA network are one and the same.

Figure 3:
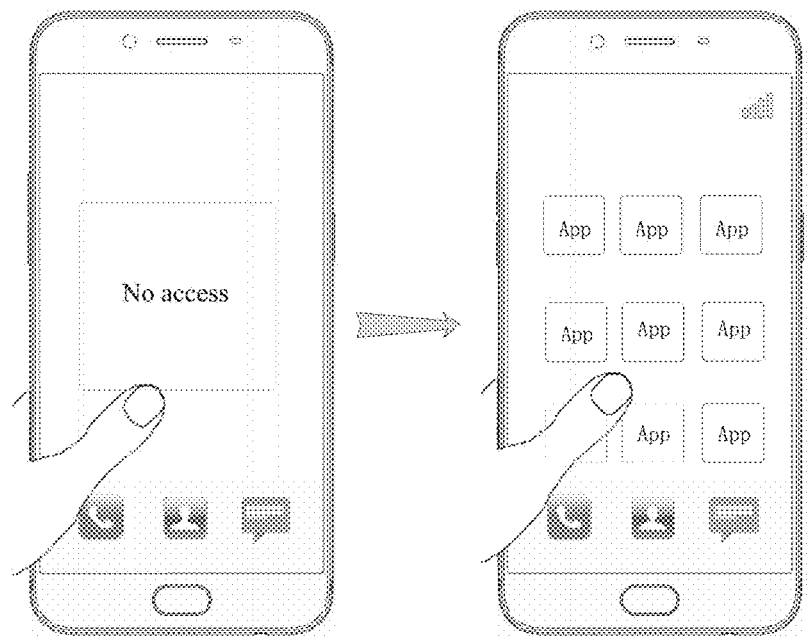
FIG. 3 is a schematic diagram of an application scenario of a method for searching for a network according to an implementation of the present disclosure.

FIG. 3 is a schematic diagram of an application scenario of a method for searching for a network according to an implementation of the present disclosure. As illustrated in the left part of FIG. 3, when the terminal roams to the visited place, such as Japan or Korea, the time for searching may be increased, and the terminal may not access any communication network even after the no-service timer times out. However, according to the present disclosure, as illustrated in the right part of FIG. 3, the efficiency of searching is improved, the time for searching is effectively reduced, and thus quick access is achieved.

According to the present disclosure, since the mode in which the terminal searches for the WCDMA network is added at the end of the list of modes, the time for searching is not increased in the home place when the terminal returns to the home place; furthermore, since the mode in which the terminal searches for the WCDMA network is set to be a full-band searching mode, the WCDMA networks in various visited places can be searched for on all the frequency bands, such that the time for searching can be effectively reduced and the number of the visited places where the present disclosure can be applied can be increased.

Figure 4:
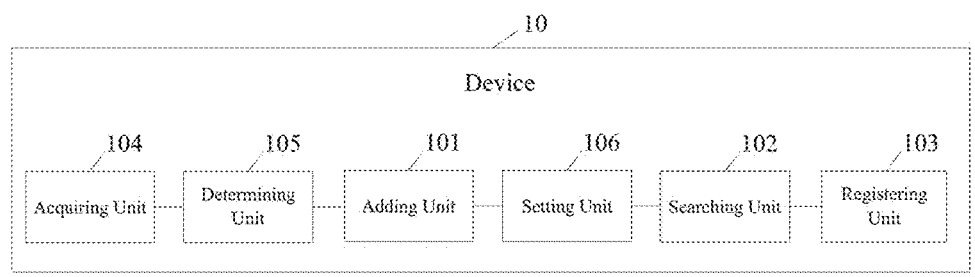
FIG. 4 is a schematic structural diagram of a device configured to search for a WCDMA network according to an implementation of the present disclosure.

FIG. 4 is a schematic structural diagram of a device 10 configured to search for a WCDMA network according to an implementation of the present disclosure. The device 10 will be described in detail below with reference to FIG. 4. As illustrated in FIG. 4, the device 10 may include an adding unit 101, a searching unit 102, and a registering unit 103.

The adding unit 101 is configured to add a mode in which a terminal searches for a WCDMA network to a list of modes in which the terminal searches for communication networks, when a SIM card inserted in the terminal belongs to a first operator not supporting a WCDMA standard.

The searching unit 102 is configured to search for a first WCDMA network operated in a visited place when the terminal roams to the visited place, and reside in the first WCDMA network to acquire location information of the visited place.

The registering unit 103 is configured to register in a second WCDMA network operated in the visited place, according to the location information of the visited place.

In at least one implementation, the visited place may be Korea or Japan.

In at least one implementation, as illustrated in FIG. 4, the device 10 may further include an acquiring unit 104 and a determining unit 105.

The acquiring unit 104 is configured to acquire an ICCID of the SIM card inserted in the terminal.

The determining unit 105 is configured to determine whether the SIM card belongs to the first operator not supporting the WCDMA standard, according to the ICCID.

In at least one implementation, the adding unit 101 is configured to add the mode in which the terminal searches for the WCDMA network to the list of modes in which the terminal searches for the communication networks when the SIM card inserted in the terminal belongs to the first operator, and add the mode in which the terminal searches for the WCDMA network at the end of the list of modes.

In at least one implementation, the location information of the visited place includes a MCC, and the registering unit 103 may include an acquiring sub-unit and a searching sub-unit.

The acquiring sub-unit is configured to acquire a list of an identifier of at least one WCDMA network operated in the visited place, according to the MCC.

The searching sub-unit is configured to search for the at least one WCDMA network according to the list of the identifier of the at least one WCDMA network, and register in the second WCDMA network.

In at least one implementation, as illustrated in FIG. 4, the device 10 may further include a setting unit 106 configured to set the mode in which the terminal searches for the WCDMA network to be a full-band searching mode.

It should be understood that functions of the aforementioned units in the device 10 may be known from the implementations described with reference to FIGS. 1 to 3 and are not described herein.

In the above-mentioned implementation, the device 10 is in the form of units. The "unit" herein may refer to an application-specific integrated circuit (ASIC), a processor and a memory executing one or more software or firmware programs, an integrated logic circuit, and/or other components having the aforementioned functions. In addition, in at least one implementation, the functions of the adding unit 101, the searching unit 102, and the registering unit 103 may be achieved by a processor 201 of a terminal as illustrated in FIG. 5.

Figure 5:
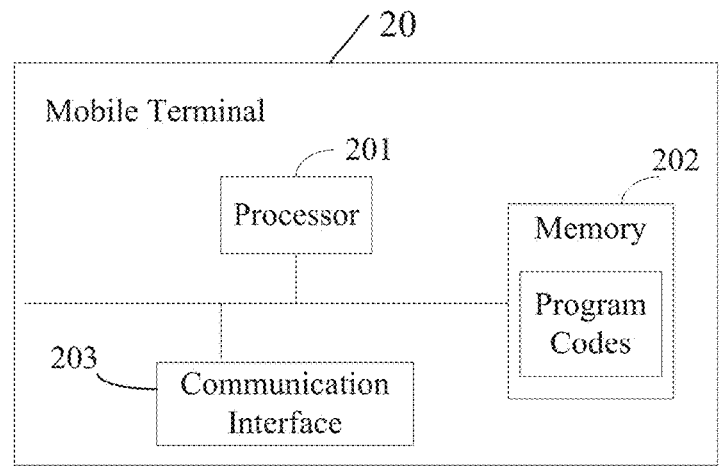
FIG. 5 is a schematic structural diagram of a terminal according to an implementation of the present disclosure.

FIG. 5 is a schematic structural diagram of a terminal 20 according to an implementation of the present disclosure. The terminal 20 will be described in detail below with reference to FIG. 5. As illustrated in FIG. 5, the terminal 20 may include at least one processor 201, at least one memory 202, and at least one communication interface 203. The processor 201, the memory 202, and the communication interface 203 are mutually communicatively connected by a communication bus.

The processor 201 may be a general-purpose central processing unit (CPU), a microprocessor, an ASIC, or one or more integrated circuits configured to control performance of the above-mentioned method.

The communication interface 203 is configured to communicate with other devices or communication networks, such as Ethernet, a radio access network (RAN), a wireless local area network (WLAN), and the like.

The memory 202 may include a read-only memory (ROM) and other types of static memories capable of storing static information and instructions, a random access memory (RAM) and other types of dynamic memories capable of storing dynamic information and instructions, an electrically erasable programmable read-only memory (EEPROM), a compact disc read-only memory (CD-ROM) and other optical disks (including a laser disc, an optical disc, a digital versatile disc (DVD), a blue-ray disc, and so on), a magnetic storage memory and other magnetic storage media, and any other storage media which are configured to carry or store program codes in the form of instructions or data structures and can be accessed by a computer, but is not limited to them. The memory 202 can be arranged independently and electrically connected to the processor 201 via the communication bus. In at least one implementation, the memory 202 can also be integrated with the processor 201.

The memory 202 is configured to store program codes used to perform the above-mentioned method and executed by the processor 201. The processor 201 is configured to execute the program codes stored in the memory 202.

The program codes stored in the memory 202 are used to perform the above-mentioned method for searching for a network described with reference to FIGS. 1 to 3. The method may include, for example, adding a mode in which a terminal searches for a WCDMA network to a list of modes in which the terminal searches for communication networks, when a SIM card inserted in the terminal belongs to a first operator not supporting a WCDMA standard; searching for a first WCDMA network operated in a visited place when the terminal roams to the visited place, and residing in the first WCDMA network to acquire location information of the visited place; and registering in a second WCDMA network operated in the visited place, according to the location information of the visited place.

Figure 6:
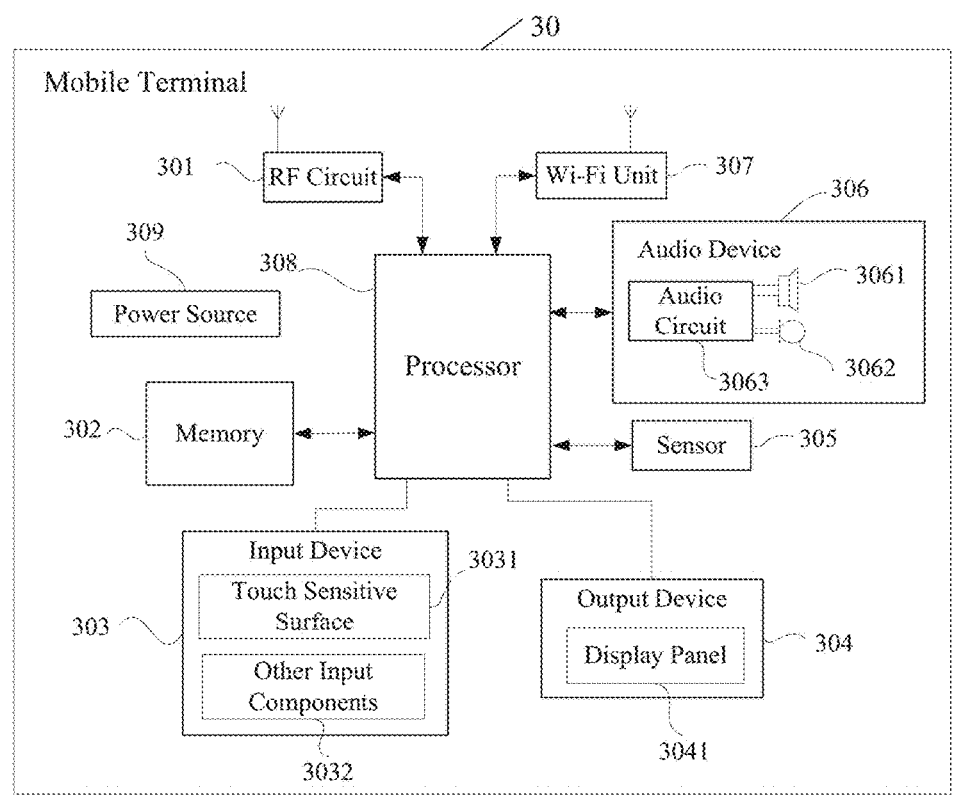
FIG. 6 is a schematic structural diagram of another terminal according to another implementation of the present disclosure.

FIG. 6 is a schematic structural diagram of another terminal 30 according to another implementation of the present disclosure. The terminal 30 may be a mobile phone, and will be described in detail below with reference to FIG. 6. As illustrated in FIG. 6, the terminal 30 may at least include a radio frequency (RF) circuit 301, a memory 302 storing one or more programs, an input device 303, an output device 304, at least one sensor 305, an audio device 306, a wireless fidelity (Wi-Fi) unit 307, a processor 308 including one or more processing cores, and a power source 309. It should be understood by persons skilled in the art that the terminal as illustrated in FIG. 6 has a structure which does not limit the terminal and may include more or fewer components than illustrated in FIG. 6, or combine certain components, or other arrangements.

The RF circuit 301 is configured to receive and transmit signals during information reception and transmission or communication processes. In at least one implementation, the RF circuit 301, after receiving downlink information from a base station, transmits it to the processor 308 for processing, and in addition, transmits uplink data to the base station. Generally, the RF circuit 301 includes, but is not limited to, an antenna, at least one amplifier, a tuner, at least one oscillator, a SIM card, a transceiver, a coupler, a low noise amplifier (LAN), and a duplexer. In addition, the RF circuit 301 can also wirelessly communicate with other terminals via a communication network. The wireless communication may support any one of communication standards or protocols including, but not limited to, the GSM, a general packet radio service (GPRS), a code division multiple access (CDMA), the WCDMA, the LTE, an e-mail, a short message service (EMS), and the like The memory 302 is configured to store one or more programs. The processor 308 is configured to execute the program stored in the memory 302 to run various functional applications and process data. The memory 302 may mainly include a program storage area and a data storage area. The program storage area can store an operating system, at least one an application (such as a sound playing application, an image displaying application, and the like). The data storage area can store data (such as photos, audio data, video data, and the like) created according to the use of the terminal 30. In addition, the memory 302 may include a high-speed RAM, and may further include a non-volatile memory, such as a magnetic disk memory, a flash memory, or other volatile solid-state memories. Correspondingly, the memory 302 can further include a memory controller which provides access to the memory 302 for the processor 308 and the input device 303.

The input device 303 is configured to receive input information and instructions, and may include a keyboard, a mouse, an operating lever, and a track ball. In at least one implementation, the input device 303 may include a touch sensitive surface 3031 and other input components 3032. The touch sensitive surface 3031, also referred to as a touch display panel or a touch control pad, is configured to sense touch operations (such as operations performed on or near the touch sensitive surface 3031 by a user using any appropriate objects or accessories, such as a finger, a stylus, and so on) and drive corresponding components connected thereto according to a preset program. In at least one implementation, the touch sensitive surface 3031 may include a touch detector and a touch controller. The touch detector detects locations touched by the user and detects signals caused by the touch operations, and transmits the signals to the touch controller. The touch controller receives the signals from the touch detector, converts the signals into coordinates of the locations touched by the user, and then transmits the coordinates to the processor 308. In at least one implementation, the touch controller can further receive and execute commands transmitted by the processor 308. In addition, in at least one implementation, the touch sensitive surface 3031 may be a resistive type, a capacitive type, an infrared type, and a surface acoustic wave type. The other input components 3032 may include, but is not limited to, a physical keyboard, a function button (such as a volume control button, a switch button, and so on), a track ball, a mouse, an operating lever, and so on.

The output device 304 is configured to display information input by the user or information provided for the user, and various graphical interfaces of the terminal 30. The graphical interfaces may include images, texts, icons, videos, and any combinations thereof. The output device 304 may include a display panel 3041. In at least one implementation, the display panel 3041 may be a liquid crystal panel or an organic light-emitting diode (OLED) panel. The touch sensitive surface 3031 may cover the display panel 3041. The touch sensitive surface 3031, when detecting the operations on or near the touch sensitive surface 3031, transmits to the processor 308 the coordinates of the locations touched by the user, and then, the processor 308 determines the types of the operations and provides corresponding visual output for the display panel 3041 according to the types of the operations. Although as illustrated in FIG. 6, the touch sensitive surface 3031 and the display panel 3041 are configured to be two independent components having input and output functions respectively, in at least one implementation, the touch sensitive surface 3031 and the display panel 3041 may be integrated together to achieve the input and output functions.

The terminal 30 may also include at least one sensor 305, such as a distance sensor, a light sensor, a motion sensor, and other sensors. The distance sensor is configured to detect a distance between the display panel of the terminal and an object covering the display panel. The light sensor is configured to detect light outside the terminal. A gravity acceleration sensor, as a type of the motion sensor, is configured to detect acceleration in various directions (generally three axis directions) and detect the value and direction of the gravity when it is stationary, and thus can be used for applications identifying gestures of the terminal 30 (such as screen auto-rotation, related game applications, and magnetometer calibration) and functions (such as step counting, tap sensing) related to vibration identification. The terminal 30 may further include other sensors, such as a gyroscope, a barometer, a hygrometer, a thermometer, an infrared sensor, and the like which are not described herein.

The audio device 306, as an audio interface between the user and the terminal 30, may include a speaker 3061, a microphone 3062, and an audio circuit 3063. The audio circuit 3063 can convert received audio data into electrical signals, and transmit the electrical signals to the speaker 3061 which in turn converts the electrical signals into audio signals and outputs the audio signals. On the other hand, the microphone 3062 can convert received audio signals into electrical signals, and transmit the electrical signals to the audio circuit 3063 which in turn converts the electrical signals into the audio data and outputs the audio data. The audio data may be output to the processor 308 for further processing and then transmitted to another terminal via the RF circuit 301, or may be output to the memory 302 for further processing. The audio circuit 3063 may also include an earphone jack configured to provide communication between the earphone and the terminal 30.

Wi-Fi is a short-range wireless transmission technology, and the terminal 30 having the Wi-Fi unit 307 can assist the user in transmitting and receiving e-mails, browsing web pages, accessing streaming media, and the like. The Wi-Fi unit 307 provides wireless broadband internet access for the user. Although the Wi-Fi unit 307 is illustrated in FIG. 6, it should be understood that the Wi-Fi unit 307 is not necessary in the terminal 30 and can be removed according to actual requirements without changing the protection scope of the present disclosure.

The processor 308 is a control center of the terminal 30, and is connected to various components of the terminal 30 via various interfaces and wires. The processor 308 runs or executes the one or more programs stored in the memory 302, calls data stored in the memory 302, performs various functions of the terminal 30, and processes data, so as to monitor the terminal 30 in its entirety. In at least one implementation, the processor 308 may include one or more processing cores. Furthermore, in at least one implementation, the processor 308 may have an application processor and a modem processor integrated therein. The application processor is mainly configured to process an operating system, a user interface, one or more applications, and the like, while the modem processor is mainly configured to process wireless communication. It should be understood that the aforementioned modem processor may not be integrated in the processor 308.

The terminal 30 further includes the power source 309 (such as a battery). In at least one implementation, the power source 309 may be logically connected to the processor 308 via a power management system, such that functions such as charging, discharging, power consumption management, and the like are achieved by the power management system. The power source 309 may further include one or more direct current or alternating current power sources, a recharging system, a fault detection circuit, a power converter or an inverter, a state indicator, and the like.

Although not illustrated, the terminal 30 may further include a camera, a blue-tooth unit, and the like, which are not described herein. In the present disclosure, the output device 304 (or the input device 303) of the terminal 30 is a touch screen, and the terminal 30 further includes the memory 302 and the processor 308. The memory 302 stores one or more programs, while the processor 308 is configured to execute the one or more programs stored in the memory 302 (non-volatile memory) to perform the blocks of the aforementioned methods for searching for the WCDMA network.

A computer-readable storage medium is further provided by an implementation of the present disclosure. The computer-readable storage medium may store one or more programs which are to be executed to perform a part of or all the blocks of the aforementioned methods for searching for the WCDMA network.

It should be noted that each the foregoing implementations of the methods has been described as a combination of a series of actions for brevity, but persons skilled in the art should understand that the present disclosure is limited to the sequence in which the actions are performed, because some of the actions can be performed in a different sequence or simultaneously according to the present disclosure. Furthermore, persons skilled in the art should also understand that the actions and the units described herein are not necessary for the present disclosure.

In the above implementations, the description for each implementation has its own emphasis, and what is not described in detail in one certain implementation may be known from relevant description for other implementations.

In the several implementations provided by the present disclosure, it should be understood that the disclosed apparatus may be implemented in other ways. For example, the described implementations of the apparatus are merely exemplary. For example, the division into units is merely a logical function division, and other division ways may also be applicable in practice, for example, multiple units or components may be combined or integrated in another system, or some features may be ignored or not implemented. Furthermore, the displayed or discussed mutual couplings or direct couplings or communicative connections may be indirect couplings or communicative connections via some interfaces, apparatuses, or units electrically or in other ways.

The units described as separate components may or may not be physically separate, and components displayed as units may or may not be physical units, i.e., may be located in one position, or may be distributed on multiple network units. A part or all of the units may be selected according to actual requirements to achieve the purposes of the solutions of the implementations.

In addition, each of functional units in each implementation of the present disclosure may be integrated in one processing unit, or each of the units may be disposed physically independently, or two or more units may be integrated in one unit. The integrated units may be implemented in the form of hardware, or may be implemented in the form of functional software units.

The integrated units may be stored in a computer-readable memory when they are implemented in the form of functional software units and sold or used as an independent product. Based on such a concept, a part of or all the technical solutions of the present disclosure may be embodied in the form of one or more software products. The one or more software products are stored in the memory, and include several commands configured for commanding computer equipment (a personal computer, a server, a service base station, etc.) to perform all or a part of the steps of the methods described in the implementations of the present disclosure. The foregoing memory includes any medium that can store program codes, such as a USB flash memory, a removable hard disk, a read-only memory (ROM), a random access memory (RAM), a removable disk, a magnetic disk, an optical disc, or the like.

Persons skilled in the art should understand that all or a part of the steps of the methods described in the implementations can be completed by a program commanding related hardware. The program can be stored in a computer-readable memory including a USB flash memory, a removable hard disk, a read-only memory (ROM), a random access memory (RAM), a magnetic disk, an optical disc, and the like.

The implementations of the present disclosure are described in detail hereinbefore. The principles and implementations of the present disclosure are set forth by way of specific examples herein. The description of the above-mentioned implementations is merely for assisting in understanding the methods and spirits of the present disclosure. Meanwhile, based on the spirits of the present disclosure, persons skilled in the art can make modifications to the implementations and application scope. In conclusion, the content of the present disclosure should not be considered as a limitation on the present disclosure.

What is claimed is:

1. A method for searching for a network, comprising:
setting a terminal to search for a WCDMA network directly after searching for all communication networks supported by an operator of a SIM card inserted in the terminal in sequence, wherein the operator of the SIM card is not able to support a WCDMA standard;
searching for a first WCDMA network operated in a visited place directly after the all communication networks supported by the operator of the SIM card are searched for in sequence when the terminal roams to the visited place, and residing in the first WCDMA network to acquire location information of the visited place, wherein an operator belonging to the visited place supports the WCDMA standard, and a mobile country code (MCC) of the country that the operator of the SIM card belongs to is different from that of the country of the visited place; and
registering in a second WCDMA network operated in the visited place, according to the location information of the visited place.

2. The method of claim 1, further comprising:
before the setting to search for a WCDMA network, acquiring an integrated circuit card identity (ICCID) of the SIM card; and
determining whether the SIM card belongs to the operator according to the ICCID.

3. The method of claim 1, wherein the searching for a first WCDMA network operated in a visited place comprises:
searching for a first WCDMA network in a full-band searching mode.

4. The method of claim 1, wherein the location information of the visited place comprises an identifier of the first WCDMA network.

5. The method of claim 1, wherein the location information of the visited place comprises the MCC, and wherein registering in the second WCDMA network according to the location information of the visited place comprises:
   acquiring a list of an identifier of at least one WCDMA network operated in the visited place according to the MCC, wherein the first WCDMA network is one of the at least one WCDMA network and the second WCDMA network is one of the at least one WCDMA network; and
   searching for the at least one WCDMA network according to the list of the identifier of the at least one WCDMA network, and registering in the second WCDMA network.

6. The method of claim 5, wherein the list of the identifier of the at least one WCDMA network is stored in the terminal beforehand.

7. The method of claim 5, wherein the list of the identifier of the at least one WCDMA network is acquired from the first WCDMA network.

8. The method of claim 1, wherein the first WCDMA network and the second WCDMA network are the same.

9. The method of claim 1, wherein the operator of the second WCDMA network has a roaming agreement with the operator of the SIM card.

10. A terminal, comprising:
   a memory storing one or more programs; and
   a processor configured to execute the one or more programs to:
      set the terminal to search for a WCDMA network after searching for communication networks supported by an operator of a SIM card inserted in a terminal in sequence, wherein the operator of the SIM is not able to support a WCDMA standard;
      search for a first WCDMA network operated in a visited place directly after the all communication networks supported by the operator of the SIM card are searched for in sequence when the terminal roams to the visited place, and reside in the first WCDMA network to acquire location information of the visited place, wherein an operator belonging to the visited place supports the WCDMA standard, and a mobile country code (MCC) of the country that the operator of the SIM card belongs to is different from that of the country of the visited place; and
      register in a second WCDMA network operated in the visited place, according to the location information of the visited place.

11. The terminal of claim 10, wherein before the processor is configured to execute the one or more programs to set to search for the WCDMA network, the processor is configured to execute the one or more programs to:
   acquire an integrated circuit card identity (ICCID) of the SIM card; and
   determine whether the SIM card belongs to the operator according to the ICCID.

12. The terminal of claim 10, wherein the processor is configured to execute the one or more programs to search for the first WCDMA network is further configured to execute the one or more programs to:
   search for the WCDMA network in a full-band searching mode.

13. The terminal of claim 10, wherein the location information of the visited place comprises an identifier of the first WCDMA network.

14. The terminal of claim 10, wherein the location information of the visited place comprises the MCC, and wherein the one or more programs to register in the second WCDMA network according to the location information of the visited place comprises one or more programs to:
   acquire a list of an identifier of at least one WCDMA network operated in the visited place according to the MCC, wherein the first WCDMA network is one of the at least one WCDMA network and the second WCDMA network is one of the at least one WCDMA network; and
   search for the at least one WCDMA network according to the list of the identifier of the at least one WCDMA network, and register in the second WCDMA network.

15. The terminal of claim 14, wherein the list of the identifier of the at least one WCDMA network is stored in the terminal beforehand.

16. The terminal of claim 14, wherein the list of the identifier of the at least one WCDMA network is acquired from the first WCDMA network.

17. The terminal of claim 10, wherein the first WCDMA network and the second WCDMA network are the same.

18. The terminal of claim 10, wherein the operator of the second WCDMA network has a roaming agreement with the operator.

* * * * *